Dec. 26, 1967     L. KRAUS ET AL     3,360,066
DRIVE ARRANGEMENT FOR VEHICLE STEERABLE WHEELS
Filed Dec. 30, 1964
FIG.1
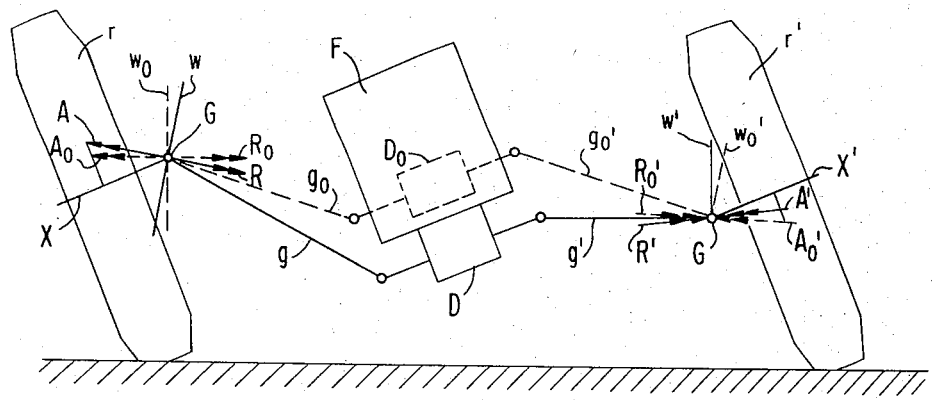
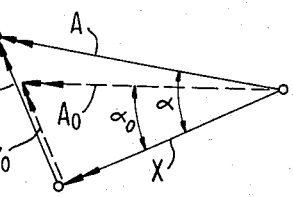
FIG.2
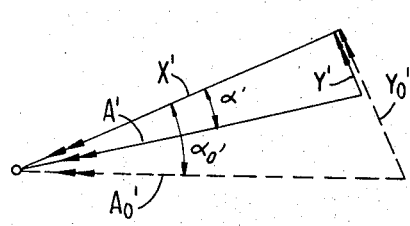
FIG.3
INVENTORS
LUDWIG KRAUS
KURT ENKE
BY Dicke & Craig
ATTORNEYS

United States Patent Office 3,360,066
Patented Dec. 26, 1967

3,360,066
DRIVE ARRANGEMENT FOR VEHICLE STEERABLE WHEELS
Ludwig Kraus, Wettstetten, near Ingolstadt, and Kurt Enke, Fellbach, Germany, assignors to Daimler-Benz Aktiengesellschaft, Stuttgart-Unterturkheim, Germany
Filed Dec. 30, 1964, Ser. No. 422,379
4 Claims. (Cl. 180—42)

The present invention relates to a drive arrangement for vehicle wheels, and more particularly to a drive arrangement for driven steerable motor vehicle wheels.

With steerable motor vehicle wheels driven by universal joint-shafts, that is, as a rule with a front wheel drive, a stiffening of the steering takes place by reason of the drive, and more particularly such stiffening becomes the more pronounced the sharper the curve which is negotiated by the vehicle. Such a stiffening in the steering can be traced back to several reasons of which the most significant one essentially consists in that the resultant moment vector of the drive is deflected or diverted with a joint-shaft angularly offset to the wheel center axis, into a direction deviating from the wheel center axis which is disposed with a homokinetic joint, that is, with an aligned joint, perpendicularly to the bisecting line of the angle between the axis of the joint-shaft and the wheel center axis, that is, between the drive and driven shaft of the joint driving the wheel. The vertical component of this vector, parallel to the wheel plane, seeks to rotate the wheel about the steering axis thereof and has to be absorbed by the steering system.

If both steerable wheels of a pair of wheels are driven by a differential gear which is disposed in the rest position of the vehicle at the height of the wheel center axes or approximately at the height thereof, whereby each of the two wheels is driven by a universal joint-shaft, and if the vehicle superstructure—such as the vehicle body possibly together with the wheels—assumes when driving through a curve an inclination toward the outside of the curve, then there occurs by reason of the angular bending of the joint-shafts one "deflecting" or "steering" vector component each of the drive in the wheel plane both at the wheel disposed on the curve outside as well as at the wheel disposed at the curve inside which seeks to rotate the wheel toward the outside of the curve, that is, of which is directed oppositely to the steering movement of the wheel.

On the other hand, the differential exerts in curve driving a blocking effect in such a manner that the outside wheel, since it runs faster and is thereby braked, is driven with a smaller moment than the inside wheel. With a normal conventional differential, with which the blocking effect is approximately 13%, the outside wheel would, therefore, be driven with about 87% and the inside wheel with about 113% of the drive moment occurring without blocking effect. The deflecting or steering vector component of the drive changes to the same extent.

The present invention now utilizes this circumstance for the decrease of the effect of the drive hardening or stiffening the steering in that the drive elements driving the joint-shafts, especially the differential gear itself, are arranged lower than the wheel center axes. It is achieved thereby that with an outwardly directed curve tilting of the vehicle superstructure—as well as possible as also of the wheels—the angle of the resulting moment vector in the drive joint is increased on the vehicle side disposed on the curve outside relative to the coordinated wheel center axis but is decreased, in contradistinction thereto, on the vehicle side disposed on the curve inside. The sides of the vehicle located on the inside and outside of the curve will be designated hereinafter as "vehicle inside" and "vehicle outside," respectively.

Since the main drive moment, when driving through a curve, falls on the inside wheel, the decrease of the stiffening steering moment opposing the steering action is particularly effective so that the total steering moment resulting from the corresponding moments of both wheels can be kept considerably lower than with a differential arranged in the usual manner at the height of the wheel center axes.

If the arrangement is, for example, made in such a manner that with a sharp curve drive the joint-shaft of the inside wheel is disposed in the direction of the wheel center axis, the stiffening moment at the inside wheel opposing the steering action could under ecrtain circumstances be decreased to zero.

The present invention becomes particularly effective if instead of a normal differential a so-called blocking or limited-slip differential with high blocking effect is utilized since the total drive moment is distributed principally only onto the inside wheel and thus with a simultaneous arrangement of the joint-shaft drive according to the present invention the steering vector component effective primarily on the curve inside could be reduced to a very small fraction. Such a blocking or limited-slip differential is illustrated in the U.S. patent to Meldola 3,186,258 issued June 1, 1965.

Accordingly, it is an object of the present invention to provide a drive arrangement for steerable wheels which avoids, by simple means, the aforementioned shortcomings and drawbacks encountered with the prior art constructions.

Another object of the present invention resides in the provision of a front wheel drive arrangement for motor vehicles in which the drive means are so arranged as to considerably reduce the effects stiffening the steering and opposing the steering action when driving through curves.

Another object of the present invention resides in the provision of a drive arrangement for steerable wheels in which the steering deflection tendencies of the drive system caused by the resulting moments are minimized.

Still a further object of the present invention resides in the provision of a drive arrangement for motor vehicles which utilizes to great advantage a blocking differential to reduce the steering deflections produced by the wheel drive system.

These and other objects, features and advantages of the present invention will become more obvious from the following description when taken in connection with the accompanying drawing which shows, for purposes of illustration only, one embodiment in accordance with the present invention, and wherein FIGURE 1 is a schematic front elevational view of a drive arrangement for a motor vehicle in accordance with the present invention, illustrating the drive arrangement of the steerable front wheels of a motor vehicle, as seen in the driving direction, when driving through a sharp right hand curve, and FIGURES 2 and 3 are vector diagrams illustrating the components at the outside wheel and at the inside wheel, respectively, in a drive arrangement according to the present invention.

Referring now to the drawing and more particularly to FIGURE 1, reference character F designates therein the schematically illustrated vehicle superstructure such as the frame or body of a self-supporting type body construction while reference character $r$ designates the outside wheel, i.e., the wheel disposed on the outside of the curve, to be referred to hereinafter as "outside" wheel and reference character $r'$ the wheel disposed on the inside of the curve, to be referred to hereinafter as the "inside" wheel. The wheels $r$ and $r'$ are provided with driven journals or pins coinciding with the wheel center axis and designated in FIGURE 1 by reference characters $x$ and $x'$ while reference characters G and G' designate the drive joints of any conventional construction, especially the homokinetic drive joints driving the wheel journals $x$ and $x'$. For purposes of comparison, two arrangements of universal joint-shaft drives are illustrated in FIGURE 1, and more particularly, on the one hand, an arrangement with a differential D$o$ (indicated in dash lines) having joint-shafts $g_o$ and $g_o'$, whereby the differential D$o$ is disposed at the height of the wheel center axes when driving along a straight path, and on the other, an arrangement according to the present invention with a lower differential D (shown in full line) having lateral universal joint-shafts $g$ and $g'$ of conventional construction.

The drive moment introduced by the joint-shafts $g$ and $g'$ into the drive joints G and G' is transmitted, as an investigation would readily demonstrate, to the wheel pins or journals $x$ and $x'$ only with a moment component. If, for example, $w_o$ and $w$ are the angle bisector between $g_o$ and $x$ and between $g$ and $x$, respectively, at the outside wheel $r$, then the vector $A_o$ and $A$ of the action moment occurring in the joint G and acting on the wheel and also the oppositely directed vector $R_o$ and $R$ of the reaction moment are disposed perpendicularly to the associated angle bisector $w_o$ and $w$, respectively, whereby the vector $A_o$ forms with the wheel center axis an angle $\alpha_o$ and vector $A$ with the wheel center axis in angle $\alpha$. The vector $A_o$ is composed, corresponding to FIGURE 2, of an axial component X and of a component $Y_o$ disposed in a direction perpendicular thereto of the wheel center plane, while the vector A correspondingly is composed of the components X and Y. Whereas the vector component X effects the drive of the wheel, the vector components $Y_o$ and Y carry out on the wheels an undesired deflecting steering effect in that they seek to rotate the wheel, as viewed from above in FIGURE 1, in the counter clockwise direction, that is in the direction toward the outside of the curve and thereby render more difficult the steering of the wheel in the curve.

The same is also true for the curve inside. Since the wheel $r'$ is driven in the same direction of rotation as the wheel $r$, so that the action moment $A'_o$ and $A'$ have to have the same direction (toward the outside of the curve) as the action moment $A_o$ and A, there results the vector diagram illustrated in particular in FIGURE 3. The vectors $A_o'$ and $R_o'$ are disposed perpendicularly to the angle bisector $w'$ whereby in contrast to the vehicle side disposed on the outside of the curve, the aforementioned moment vectors are directed mutually opposite in a pairwise manner. Corresponding to the angles $\alpha'_o$ and $\alpha'$, the vectors can again be decomposed into an axial component X' and into a deflecting or steering component $Y_o'$ and Y' perpendicular to the component X', of which the components $Y_o'$ and Y' have the same direction as the vector components $Y_o$ and Y of the oppositely disposed wheel, that is, also oppose the steering movement of the wheels in what they seek to rotate the same toward the outside of the curve.

It is at first assumed that the differential assumes the position D$o$ in such a manner that when driving through a curve the angle between $g_o$ and $x$, on the one hand, and between $g_o'$ and $x'$, on the other, are of equal size. Since by reason of the blocking effect of the differential, $A_o < A_o'$ it follows therefrom that also $Y_o < Y_o'$.

If the differential is now lowered, for example, into the position D, then the deflecting vector component $Y_o$ increases, on the one hand, corresponding to the larger angle $\alpha$ to a value Y on the outside of the curve, but the vector component $Y_o'$ decreases to Y'. Under practical conditions the deflecting or steering vector component on the inside of the curve is decreased more than the deflecting or steering vector component increases on the outside of the curve, that is $$Y_o' - Y' > Y - Y_o$$

or $$M_o = Y_o + Y_o' > M = Y + Y'$$

The difference between the total deflecting or steering moment $M_o = Y_o + Y_o'$ with a differential arrangement D$o$ and the total deflecting moment $M = Y + Y'$ with a differential arrangement D is thereby the larger the greater the blocking effect of the differential.

In the transition to the boundary case in which by reason of a strong blocking effect $Y_o$ (and therewith also Y) becomes negligeably small compared to $Y_o'$ and Y' approaches zero by lowering the differential, the total deflecting or steering moment M can also be far-reachingly adjusted to approach a value of zero.

When driving on a straight road, the deflecting vector components of the drive moments mutually offset each other with a low differential by reason of the symmetrical opposite angular position of the joint-shafts.

While we have shown and described one embodiment in accordance with the present invention, it is understood that the same is not limited thereto but is susceptible of numerous changes and modifications as known to a person skilled in the art. Even though the present invention is of particular significance for parallelly guided wheels, for example, wheels guided by means of a pair of steering arms, it is applicable also in general to other systems in which the joint-shafts form an angle with the wheel pins when driving through a curve. With all such systems the present invention is of equal significance.

Thus, while we have shown and described one embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are encompassed by the scope of the appended claims.

We claim:

1. A motor vehicle, comprising: two steerable wheels, each having a center of rotation and a universal joint drive input; steering means for pivoting said wheels about generally vertical axes for steering the vehicle; drive means including a differential mounted between said wheels; said differential having two coaxial opposite output universal joint drive means, each associated with a corresponding one of said wheels; separate means drivingly connecting each of said wheel drive input universal joints with the corresponding differential output universal joint drive means; control means for substantially decreasing the deflecting torque component normally exerted on the inside one of said wheels tending to pivot them about their generally vertical axes opposite to the steering means pivoted direction during cornering, including means mounting said differential in its entirety below the axis of rotation of said wheels when the vehicle is at rest with the wheels in a straight ahead position thereby disposing the output universal joint drive means a substantial distance below a line between said wheel universal joints when the vehicle is at rest and means in said differential for constituting said differential a limited slip differential producing at least a minimum output torque for each of said outputs.

2. The device of claim 1, including means parallelly guiding said wheels.

3. The device of claim 1, wherein each of said drivingly connecting means consists essentially of a single link.

4. The device of claim 3, including means parallelly guiding said wheels.

References Cited

UNITED STATES PATENTS

| 1,635,236 | 7/1927 | Tolson | 180—45 |
| 3,042,133 | 7/1962 | Ordorica | 180—43 |
| 3,186,258 | 6/1965 | Meldola. | |

FOREIGN PATENTS 1,317,965   1/1963   France.

A. HARRY LEVY, *Primary Examiner.*